(12) United States Patent  (10) Patent No.: US 6,747,103 B1
Vestberg et al.  (45) Date of Patent: Jun. 8, 2004

(54) HIGH-STIFFNESS PROPYLENE POLYMERS AND A PROCESS FOR THE PREPARATION THEREOF

(75) Inventors: Torvald Vestberg, Porvoo (FI); Pauli Leskinen, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/959,780

(22) PCT Filed: May 8, 2000

(86) PCT No.: PCT/FI00/00407

§ 371 (c)(1),
(2), (4) Date: Nov. 7, 2001

(87) PCT Pub. No.: WO00/68315

PCT Pub. Date: Nov. 16, 2000

(30) Foreign Application Priority Data

May 7, 1999 (FI) .................................................. 991057

(51) Int. Cl.$^7$ ............................ C08F 4/642; C08F 4/654

(52) U.S. Cl. ................ 526/128; 526/124.3; 526/124.9; 526/125.3; 526/351; 526/65; 526/904; 525/53

(58) Field of Search ............................ 526/351, 124.3, 526/125.3, 124.9, 128

(56) References Cited

FOREIGN PATENT DOCUMENTS

| EP | 0 152 701 A1 | | 8/1985 |
|----|---|---|---|
| EP | 0 171 199 A2 | | 2/1986 |
| EP | 0 177 199 A2 | * | 2/1986 |
| EP | 0 321 218 A2 | | 6/1989 |
| EP | 0 607 703 A1 | * | 7/1994 |
| WO | WO 97/43321 A1 | | 11/1997 |
| WO | WO 99/24478 A1 | | 5/1999 |

* cited by examiner

*Primary Examiner*—Roberto Rabago
(74) *Attorney, Agent, or Firm*—Birch, Stewart, Kolasch & Birch, LLP

(57) ABSTRACT

The present invention concerns high-stiffness polymer composition and a process for producing a polymer composition by nucleated with a polymeric nucleating agent containing vinyl compound units. The method comprises modifying a catalyst by polymerizing a vinyl compound in the presence of said catalyst and a strongly coordinating donor in a medium, which does not essentially dissolve the polymerized vinyl compound, and by continuing the polymerization of the vinyl compound until the concentration of unreacted vinyl compounds is less than about 0.5 wt-%. The thus obtained modified catalyst composition is used for polymerizing propylene optionally together with comonomers in the presence of said modified catalyst composition. Modification of the catalyst according to the present invention will reduce production costs and provide highly reliable catalyst activity and polymers of high stiffness.

55 Claims, 1 Drawing Sheet

HIGH-STIFFNESS PROPYLENE POLYMERS AND A PROCESS FOR THE PREPARATION THEREOF

This application is the national phase under 35 U.S.C. §371 of PCT International Application No. PCT/FI00/00407 which has an International filing date of May 8, 2000, which designated the United States of America and was published in English.

BACKGROUND OF THE INVENTION

1. Field of the Invention

The present invention relates to propylene polymers. In particular, the present invention concerns high-stiffness propylene homopolymers and propylene copolymers containing a high-stiffness polypropylene matrix. The invention also relates to a process for preparing propylene homo- and copolymers.

2. Description of Related Art

Propylene (PP) homo- and copolymers have excellent resistance to heat and chemicals as well as attractive mechanical properties, such as stiffness and impact resistance. However, processing of polypropylene by, e.g., injection moulding, thermoforming or blow moulding, to form thin-walled containers has resulted in products having insufficient stiffness, transparency and cycle time. This is caused by the semi-crystalline nature of polypropylene.

In the prior art it has been proposed to improve the stiffness, transparency and cycle time of moulded polypropylene by blending the polymer with various nucleating agents such as dibenzilidene sorbitol (DBS), sodium benzoate or di(alkylbenzilidene)sorbitol. These traditional nucleating agents tend to bleed out from the polymer composition during processing and many of them give rise to fumes with an offensive smell. As a solution to these problems, it has been suggested in the art to use vinyl compounds, such as polymers of vinyl cycloalkanes and 3-methyl-1-butene, as nucleating agents in the form of propylene copolymers or polypropylene compounds, cf. EP Patent Specifications Nos. 0 151 883, 0 152 701, 0 206 515, 0 368 577 0 369 658 and0 417 319. EP Patent No.0 152 701 discloses prepolymerization of Ziegler-Natta catalysts with vinyl cyclohexane to provide a polymer slurry which is washed and distilled to produce a vinyl cyclohexane powder containing the active catalyst. The prepolymerized catalyst composition is then used for polymerization of propylene to form a propylene copolymers with improved stiffness and having a high degree of crystallinity and a high crystallization temperature.

There are some major problems associated with the prior art solutions using polymerized vinyl compounds for nucleation of polypropylene. Thus, the products contain impurities in the form of unreacted monomers and extensive washing of the product has to be carried out before the catalyst can be used. These washing steps will reduce that activity of the catalyst. In fact, the whole work-up of the prepolymerized catalyst, including separation of the catalyst from the polymerization medium, washing and drying, will cause extra costs and impair the activity of the catalyst. Further, if very high stiffness properties are desired, they are not achieved with these polymers without adding specific fillers or additives.

Finally, it should be pointed out that it is known in the art to carry out prepolymerization in a medium comprising a viscous substance and to continue the prepolymerization with vinyl cyclohexane or to carry out the prepolymerisation in the presence of 4-methyl-1-pentene monomer and a weakly coordinating donor, MTBE (cf. Finnish Patent No. 95387). Due to the fact that, e.g., no washing, drying, sieving and transferring steps are needed, the catalyst activity is maintained.

SUMMARY OF THE INVENTION

It is an object of the present invention to eliminate the problems relating to the prior art and to provide nucleated propylene homopolymers, propylene copolymers comprising propylene random and heterophasic copolymers.

In particular the present invention aims at providing high-stiffness propylene homo-polymers as well as propylene copolymers.

The present invention also aims at providing a process by which it is possible to prepare modified catalysts providing excellent nucleation of propylene polymers and containing essentially no reactant or solvent residues which would impair the long-term activity of the catalysts. In particular, it is an object of the present invention to provide a process for increasing the stiffness of nucleated polypropylene. Further, in case of propylene homopolymers, as a final product or as polymer matrix, the amount of xylene solubles comprised in the polymer will be reduced.

Further, it is an object of the present invention to provide extruded and moulded products comprising the present propylene homo- and copolymer compositions.

These and other objects, together with the advantages thereof over known processes and products, which shall become apparent from the specification which follows, are accomplished by the invention as hereinafter described and claimed.

The invention is based on providing a specific kind of catalyst system of Ziegler-Natta type useful for polymerization of propylene, optionally together with comonomers, for producing propylene polymers having high-stiffness properties. The catalyst is modified by polymerizing a vinyl compound in the presence of said catalyst. The modification takes place in a medium which is a liquid or a highly viscous hydrocarbon medium and which does not dissolve the polymerized polymer. Further, the modification is accomplished in such a way that all or practically all vinyl compound used for modification is consumed during polymerization. To reach that aim, the polymerization is continued at elevated temperature until the concentration of the unreacted vinyl compounds in the catalyst composition after polymerization is about 0.5 wt-%, preferably less than 2000 ppm by weight and in particular 1000 ppm by weight or less. A sufficient amount of the initial reactant is a maximum of 10 times, preferably below three times the weight of the catalyst. The modification is carried out before any conventional, usually continuous prepolymerization with an olefinic monomer, to ensure that the polymerization of the vinyl compound is complete.

As a result of these features, the amount of reactant residues in the modified catalyst composition is small, and in the final propylene polymer it is below limits of determination using the Gas Chromatography-Mass Spectrometry (GC-MS) method, which is less than 0.01 ppm by weight. Since the reaction medium contains only very small amounts of unreacted reactant residues or dissolved polymer residues, no washing of the modified catalyst composition is needed before the catalyst is fed to polymerization.

According to the present invention the stiffness of the polymer can further be improved if the above catalyst modification is carried out in the presence of external donor, particularly a strongly coordinating external donor.

Further, according to the invention an improved stiffness/impact strength balance can be obtained for heterophasic polypropylenes. Accordingly, either the stiffness is higher, while the impact strength remains on the desired level, or the impact strength is better, while the stiffness remains on the desired level, or both the stiffness and the impact strength are slightly better, than if the modification were carried out in the absence of the strongly coordinating external donor.

According to another aspect of the present invention, in the case of propylene homopolymers, the amount of xylene solubles formed in the nucleated polypropylene is reduced. Thus, it has been found that the amount of xylene solubles can be radically reduced when the catalyst modification is carried out according to the invention by polymerizing the catalyst with a vinyl compound in the presence of a strongly coordinating donor. As a result, a high-stiffness propylene homopolymer is obtained exhibiting a xylene solubles concentration of less than 1.5%. Propylene homopolymer can be a final product or a polymer matrix, into which other comonomers, such as α-olefins or ethylene, can be combined.

More specifically, the propylene polymer according to the invention is mainly characterized by a nucleated high-stiffness propylene polymer composition obtainable by homopolymerization or copolymerization of propylene in the presence of a catalyst system comprising a catalyst component, a cocatalyst component, and an external donor, the procatalyst component of the catalyst system containing magnesium, titanium, halogen and an electron donor, said catalyst being modified by polymerizing it with a vinyl compound of the formula

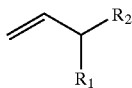

wherein $R_1$ and $R_2$ together form a 5 or 6 membered saturated or unsaturated or aromatic ring in the presence of a cocatalyst and a strongly coordinating external donor.

The process according to the present invention is characterized by a process for producing a high-stiffness propylene polymer nucleated with a polymeric nucleating agent containing vinyl compound units, comprising the steps of modifying a catalyst system, the procatalyst component of which contains magnesium, titanium, halogen and an electron donor, by polymerizing a vinyl compound of the formula wherein $R_1$ and $R_2$ together form a 5 or 6 membered saturated or unsaturated or aromatic ring, at a weight ratio of the vinyl compound to the catalyst amounting to 0.1 to below 3, in the presence of said catalyst, a cocatalyst and a strongly coordinating external donor, by carrying out the modification in a medium which does not essentially dissolve the polymerized vinyl compound and by continuing the polymerization of the vinyl compound until the concentration of unreacted vinyl compounds is less than about 0.5 wt-%, to produce a modified catalyst composition, said modification being carried out essentially before any prepolymerization step of the catalyst with an olefinic monomer, and polymerizing propylene optionally together with comonomers in the presence of said modified catalyst composition.

The invention achieves a number of considerable advantages, some of which were already discussed above. In particular it can be noted that the present propylene polymers are characterized not only by high stiffness but also by high crystallinity and high crystallization temperature. In comparison to conventional polypropylene the present polymers exhibit good mechanical properties, such as high modulus, high heat resistance and water vapour barrier. Further, an improved balance between stiffness and impact strength of block copolymers can be obtained. Very good and consistant nucleation improves clarity in a better way than with conventional nucleating agents. Nucleation dominates effect from different pigments; this means consistent shrinkage and warpage in multicoloured parts. The crystallinity is influenced by the high isotacticity (preferably >98 %) of the homopolymer and by the effective nucleation with the polymerised vinyl compounds.

According to the invention propylene polymers having from at least 3%, preferably from at least 5%, up to 10%, or even up to 15%, higher stiffness can be obtained than without using a donor in the modification step. Propylene heterophasic copolymers of the invention exhibit from 2% up to 20% higher impact strength than would be obtainable by polymerization of propylene and ethylene/propylene with a catalyst, which is modified in the absence of a strongly coordinating external donor.

With the present invention the level of xylene solubles can be decreased to the same level as without modification with a vinyl compound. The particular benefit of the increased stiffness is that it is possible to produce materials, both homopolymers and heterophasic PP copolymers, which exhibit higher stiffness than conventional nucleated products. This feature is of particular importance for the manufacture of pipes, such as smooth solid wall pipes, fittings, and pipe system details, e.g. valves, chambers and manholes, for indoor or buried sewage, multilayer pipes and fittings for indoor or buried sewages, and structured wall pipes and fittings for buried sewage.

In addition to pipes, the present compositions can be used in any kind of polymer articles. Particular advantages are obtained by applying the compositions to the manufacture of appliances, automotive parts, cups, pails, containers, caps or closures. The new material can also be used in various cable and tube applications.

According to one preferred embodiment, which is described in more detail below, the donor used in the modification step is the same as used in propylene polymerization.

Modification of the catalyst by polymerization of vinyl compounds in the liquid or highly viscous medium described above will reduce production costs because higher capacities can be used and no wastes are formed. Reliability of the catalyst activity is good because this modification is a part of the polymer production and no kind of transferring, drying or sieving is needed.

A further advantage of the invention is that no other nucleating agent is needed and/or the amount of nucleating agents added can be reduced. Further, the amount of donor used in the propylene polymerization can be reduced. Also improvements in operability of the process have been noticed.

Because the final products do not contain harmful residues of the vinyl compounds, the propylene polymers manufactured by the present invention have a broad range of application.

By using the modified catalyst compositions of the present invention, propylene polymers can be prepared having a Melt Flow Rate (MFR$_2$) of 0.01 to 1500 g/10 min (measured by ISO Standard 1133, at 230° C., 2.16 kg load) and a $T_{cr}$ of over 7° C. higher than the $T_{cr}$ of the corresponding non-nucleated polymer. The crystallinity of propylene homopolymers is generally over 48%.

Next, the invention will be more closely examined with the aid of the following detailed description with reference to the attached drawing.

DETAILED DESCRIPTION OF THE INVENTION

Figure 1:
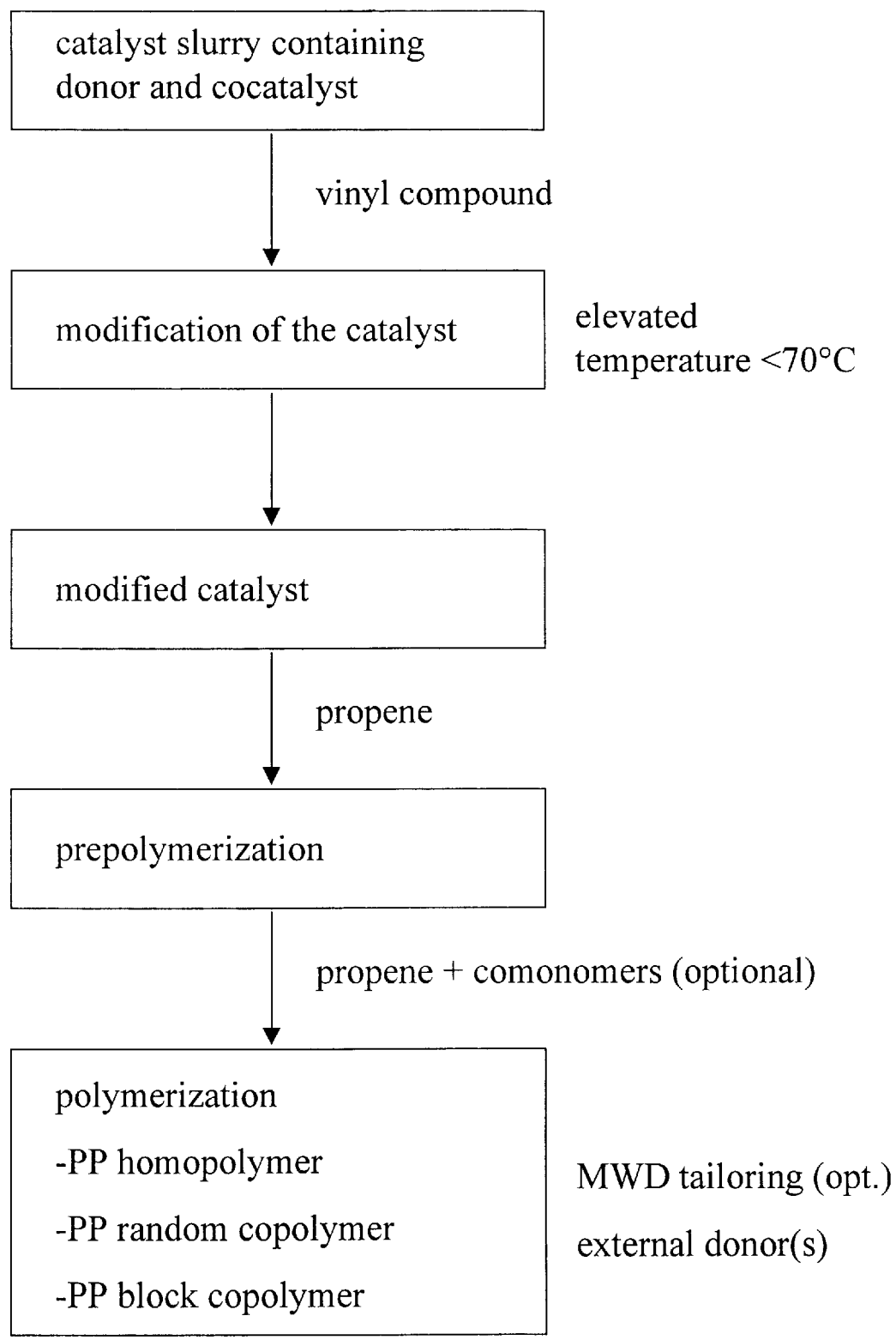
FIG. 1 shows the block diagram of a process according to an embodiment of the present invention.

Generally, the present high-stiffness propylene polymers nucleated with a polymeric nucleating agent containing vinyl compound units can be obtained by a process according to the present invention by modifying the catalyst in the presence of a strongly coordinating donor and by prepolymerizing the modified catalyst composition with propylene and/or other α-olefin(s) and/or ethylene and polymerizing propylene optionally together with comonomers (α-olefin(s) and/or ethylene) in the presence of said modified and prepolymerized catalyst composition. The vinyl compound modification step is thus carried out as a first treatment before any prepolymerization with an olefin monomer.

The above steps are also depicted in somewhat more detail in the attached drawing. Thus, according to the embodiment shown in the block diagram, the catalyst, the external donor and an aluminium containing cocatalyst, such as an organoaluminium compound, are slurried in a suitable medium, then the vinyl compound is added and subjected to polymerization in the presence of said catalyst, external donor and the cocatalyst at an elevated temperature of less than 70° C. to provide a modified catalyst. The thus obtained catalyst composition is prepolymerized with propylene (or another α-olefin and/or ethylene) and then the prepolymerized catalyst composition is used for catalyzing polymerization of propylene optionally with comonomers. The catalysts used preferably comprise Ziegler-Natta type high-yield catalysts.

Prepolymerization here means a usually continuous process step, prior to the main polymerization step(s), wherein the catalyst is polymerized with olefin(s) to a minimum degree of 10 g polyolefin per 5 g of the catalyst. The polymers prepared comprise propylene homopolymers, propylene random copolymers and propylene block copolymers. Depending on the desired properties of the propylene polymer, the molar mass distribution thereof can be tailored as described below.

In the following, the main features of the invention are discussed in greater detail.

The vinyl compounds used for catalyst modification by polymerization are represented by the formula I

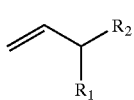

(I)

wherein $R_1$ and $R_2$ together form a 5 or 6 membered saturated or unsaturated or aromatic ring or they stand independently for a lower alkyl comprising 1 to 4 carbon atoms.

The following specific examples of vinyl compounds can be mentioned: vinyl cycloalkanes, in particular vinyl cyclohexane (VCH), vinyl cyclopentane, vinyl-2-methyl cyclohexane and vinyl norbornane, 3-methyl-1-butene, styrene, p-methyl-styrene, 3-ethyl-1-hexene or mixtures thereof. VCH is a particularly preferred monomer.

For the purpose of the present invention "nucleated propylene polymer" stands for a polymer having an increased and controlled degree of crystallinity and a crystallization temperature which is at least 7° C., preferably at least 10° C. and in particular over 13° C. higher than the crystallization temperature of the corresponding non-nucleated polymer, being higher than 120° C., preferably over 124° C. and in particular over 126° C. The crystallinity of the homopropylene polymers of the invention is over 50%. According to the invention, nucleated high-stiffness propylene polymers are obtained when the modification of the catalyst is carried out in the presence of strongly coordinating external donors.

The nucleated propylene polymers or copolymers contain about 0.001 to 2%, preferably about 0.001 to 1%, more preferably 0.001 to 0.1%, in particular 0.0001 to 0.01% (calculated from the weight of the composition) of the above-mentioned polymerized vinyl compound units.

The polymerization of the vinyl compound, e.g. VCH, can be done in any inert fluid that does not dissolve the polymer formed (e.g. polyVCH). It is important to make sure that the viscosity of the final catalyst/polymerized vinyl compound/inert fluid mixture is sufficiently high to prevent the catalyst particles from settling during storage and transport. The adjustment of the viscosity of the mixture can be done either before or after the polymerization of the vinyl compound. It is, e.g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably about 0.1 to 2.0, and in particular about 0.1 to 1.5. It should be noted that no benefits are achieved by using vinyl compounds in excess.

Further, the reaction time of the catalyst modification by polymerization of a vinyl compound should be sufficient to allow for complete reaction of the vinyl monomer, i.e. the polymerization is continued until the amount of unreacted vinyl compounds in the reaction mixture (including the polymerization medium and the reactants) is less than 0.5 wt-%, in particular less than 2000 ppm by weight (shown by analysis). Thus, when the prepolymerized catalyst contains a maximum of about 0.1 wt-% vinyl compound, the final vinyl compound content in the polypropylene will be below the limit of determination using the GC-MS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10 to 70° C., preferably 35 to 65° C.

According to the invention the external donor present during the modification step can be a silane based donor having generally the formula IV:

$$R^1_n R^2_m Si(R^3O)_{4-n-m} \quad (IV)$$

wherein

| | |
|---|---|
| $R^1$ and $R^2$ | can be the same or different and they stand for a linear, branched or cyclic aliphatic, or aromatic hydrocarbon group; |
| R3 | is methyl or ethyl; |
| n | is an integer 0 to 3; |
| m | is an integer 0 to 3; and |
| n + m | is 1 to 3, | with the proviso that the coordinating effect of the donor is stronger than that of a donor of formula (IV) wherein $R^1$ is methyl, $R^3$ is methyl and $R^2$ is a cyclohexyl group. The strongly coordinating donor can also be a 1,3-diether donor having the formula III:

$$R^4R^5C(COMe)_2 \quad (III)$$

wherein $R^4$ and $R^5$ are the same or different and stand for a linear, branched or cyclic aliphatic or an aromatic hydrocarbon group.

The aliphatic groups in the meanings of $R^1$ and $R^2$ can be saturated or unsaturated. In the meanings of $R^1$, $R^2$, $R^3$, $R^4$ and $R^5$ linear $C_1$ to $C_{12}$ hydrocarbons include methyl, ethyl, propyl, butyl, octyl and decanyl. The branched alkyl groups may comprise 1 to 12 carbon atoms. As examples of suitable saturated branched $C_{1-8}$ alkyl groups, the following can be mentioned: isopropyl, isobutyl, isopentyl, tert-butyl, tert-amyl and neopentyl. Cyclic aliphatic groups preferably contain 4 to 8 carbon atoms comprise, e.g., cyclopentyl, cyclohexyl, methyl cyclopentyl and cycloheptyl.

The donors used for the present invention are strongly coordinating donors which form relatively strong complexes with catalyst surface, mainly with $MgCl_2$ surface in the presence of aluminium alkyl and $TiCl_4$. The donor components are characterised by a strong complexation affinity towards catalyst surface and a sterically large and protective hydrocarbon. Strong coordination with $MgCl_2$ requires oxygen-oxygen distance of 2.5 to 2.9 Å [Albizzati et al., Macromol. Symp. 89 (1995) 73–89].

According to a preferred embodiment, strongly coordinating donors have the structure of the general formula II $$R^6_n Si(OMe)_{4-n} \quad (II)$$

wherein $R^6$ is a branched or cyclic aliphatic group or an aromatic hydrocarbon group, and n is 1 or 2, preferably 2. [Härkönen et al., Macromol. Chem. 192 (1991) 2857–2863].

In particular, the external donor is selected from the group consisting of dicyclopentyl dimethoxysilane, diisopropyl dimethoxysilane, di-isobutyl dimethoxysilane, and di-t-butyl dimethoxysilane, dicyclopentyl dimethoxysilane being particularly preferred.

During the propylene polymerization the same external donors as in the modification steps can be used.

An organoaluminum compound, alkaline metal compound or alkaline earth metal compound is used as a cocatalyst.

The modification of the catalyst is carried out by feeding the inert fluid, the catalyst, the cocatalyst and the donor in desired order into a stirred (batch) reactor. It is preferred to feed the inert fluid first and then the cocatalyst to remove any impurities. It is also possible to add the catalyst after the inert fluid and then the cocatalyst with the donor.

The weight ratio of the vinyl compound to the catalyst is less than 3, preferably 2 or less. The vinyl compound is reacted with the catalyst until all or practically all of the vinyl compound has reacted. As mentioned above, a polymerization time of 1 hour represents a minimum on an industrial scale, usually the reaction time should be 5 hours or more.

According to the invention, in the modification step the molar ratio between the donor and the Ti of the catalyst is 0.1 to 10, preferably 0.3 to 5, in particular 0.5 to 2.0. The Al/Ti molar ratio is in excess of 1, preferably 2 to 10, in particular 2.5 to 6.

After the reaction, the modified catalyst can be separated from the reaction medium or the content of the entire reactor batch is used for polymerization of propylene. The separation of the catalyst can be carried out by, e.g., filtering or decanting.

As catalyst any stereospecific Ziegler-Natta catalyst for propylene polymerization can be used, which is capable of catalyzing polymerization and copolymerization of propylene and comonomers at a pressure of 5 to 100 bar, in particular 25 to 80 bar, and at a temperature of 40 to 110° C., in particular 60 to 110° C.

Generally, the Ziegler-Natta catalyst used in the present invention comprises a catalyst component, a cocatalyst component, an external donor, the catalyst component of the catalyst system primarily containing magnesium, titanium, halogen and an internal donor.

The catalyst preferably contains as a transition metal compound of the procatalyst component titanium trichloride or titanium tetrachloride.

Examples of suitable catalyst systems are described in, for example, Finnish Patents Nos. 86866, 96615 and 88047 and 88048.

One particularly preferable catalyst, which can be used in the present invention, is disclosed in FI Patent No. 88047. Another preferred catalyst is disclosed in Finnish Patent Application No. 963707.

A catalyst system useful in the present process can be prepared by reacting a magnesium halide compound with titanium tetrachloride and an internal donor. The magnesium halide compound is, for example, selected from the group of magnesium chloride, a complex of magnesium chloride with a lower alkanol and other derivatives of magnesium chloride. $MgCl_2$ can be used as such or it can be combined with silica, e.g. by absorbing the silica with a solution or slurry containing $MgCl_2$. The lower alkanol used can be preferably methanol or ethanol, particularly ethanol.

The titanium compound used in the preparation of the procatalyst is preferably an organic or inorganic titanium compound, having an oxidation state of titanium of 3 or 4. Also other transition metal compounds, such as vanadium, zirconium, chromium, molybdenum and tungsten compounds can be mixed with the titanium compound. The titanium compound usually is halide or oxyhalide, an organic metal halide, or a purely metal organic compound, in which only organic ligands have been attached to the transition metal. Particularly preferable are the titanium halides, especially $TiCl_4$. Preferably the titanation is carried out in two or three steps.

The Ziegler-Natta catalyst used can also be a heterogeneous unsupported $TiCl_3$-based catalyst. This kind of catalysts are typically solid $TiCl_3$ in a delta crystalline form which are activated with aluminium-chloride-alkyls, such as diethylaluminiumchloride. The solid $TiCl_3$ catalysts are typically prepared by reduction of $TiCl_4$ with aluminium-alkyls and/or aluminium-chloride-alkyls, possibly combined with heat treatment to maximise the desired delta crystalline form of $TiCl_3$. The performance, especially stereospecificity, of these catalyst can be improved by using Lewis-bases (electron donors), such as esters, ethers or amines.

One particularly attractive catalyst type comprises a trans-esterified catalyst, in particular a catalyst transesterified with phthalic acid or its derivatives (cf. the Finnish patents mentioned above). The alkoxy group of the phthalic acid ester used in the transesterified catalyst comprises at least five carbon atoms, preferably at least 8 carbon atoms. Thus, as the ester can be used for example propylhexyl phthalate, dioctyl phthalate, dinonyl phthalate, diisodecyl phthalate, di-undecyl phthalate, ditridecyl phthalate or ditetradecyl phthalate.

The partial or complete transesterification of the phthalic acid ester can be carried out e.g. by selecting a phthalic acid ester—a lower alcohol pair, which spontaneously or with the aid of a catalyst, which does not damage the procatalyst composition, transesterifies the catalyst at an elevated temperatures. It is preferable to carry out the transesterification at a temperature, which lies in the range of 110 to 150° C., preferably 120 to 140° C.

Summarizing what has been stated above, according to one particularly preferred embodiment for modification of Ziegler Natta catalyst in a viscous medium, the modification comprises the steps of introducing a catalyst, a cocatalyst and an external donor into the reaction medium comprising an inert fluid;

feeding a vinyl compound to the agitated reaction medium at a weight ratio of 0.1 to 1.5 vinyl compound/catalyst;

subjecting the vinyl compound to a polymerization reaction in the presence of said catalyst at a temperature of 35 to 65° C.; and continuing the polymerization reaction until a maximum concentration of the unreacted vinyl compound of less than 2000 ppm, preferably less than 1000 ppm by weight is obtained.

Following the modification of the catalyst with the vinyl compound of the first preferred embodiment of the invention, the catalyst is fed to continuous prepolymerization with propylene and/or other α-olefin(s) and/or ethylene following by polymerization of propylene optionally together with other α-olefin(s) and/or ethylene.

The propylene homo- or copolymer can have a unimodal or bimodal molar mass. Thus, the equipment of the polymerization process can comprise any polymerization reactors of conventional design for producing propylene homo- or copolymers.

For the purpose of the present invention, "slurry reactor" designates any reactor, such as a continuous or simple batch stirred tank reactor or loop reactor operating in bulk or slurry and in which the polymer forms in particulate form. "Bulk" means a polymerization in reaction medium that comprises at least 60 wt-% monomer. According to a preferred embodiment the slurry reactor comprises a loop reactor. By "gas phase reactor" is meant any mechanically mixed or fluid bed reactor. Preferably the gas phase reactor comprises a mechanically agitated fluid bed reactor with gas velocities of at least 0.2 m/sec.

Thus, the polymerization reactor system can comprise one or more conventional stirred-tank slurry reactors, as described in WO 94/26794, or one or more gas phase reactors. Preferably the reactors used are selected from the group of loop and gas phase reactors and, in particular, the process employs at least one loop reactor and at least one gas phase reactor. This alternative is particularly suitable for producing bimodal polypropylene. By carrying out the polymerization in the different polymerization reactors in the presence of different amounts of hydrogen, the MWD of the product can be broadened and its mechanical properties and processability improved. It is also possible to use several reactors of each type, e.g. one loop reactor and two or three gas phase reactors, or two loops and one gas phase reactor, in series.

A preferred embodiment of the invention comprises carrying out the polymerization in a process comprising loop and gas phase reactors in a cascade where the loop reactor operates in liquid propylene and at high polymerization temperatures. It is possible to have a flash between loop and gas phase reactors. The second polymerization step is made in gas phase reactor(s) in order to broaden the molar mass distribution of the polymer.

In every polymerization step it is possible to use also comonomers selected from the group of ethylene, propylene, butene, pentene, hexene and alike as well as their mixtures.

As pointed out above, the polymerization can be carried out at high polymerization temperatures. With transesterified high-yield ZN-catalysts, these temperatures will increase the isotacticity of the homopolymers. At 80 to 90° C., a transesterified catalyst, prepared according to FI 88047, together with a strongly coordinating external donor (dicyclopentyl dimethoxysilane) gives high yield and low xylene solubles values of less than 1.5%, in particular less than 1.4% of even below 1% at 70° C. for propylene homopolymers.

By the present invention it is possible to provide materials, both propylene homopolymer and copolymers (cf. below) with higher stiffness and/or higher impact strength than conventional nucleated PP products. This feature is particularly beneficial for pipes and tubes. Another advantage is that it is possible to use lower amounts of donor during the polymerization process. Thus, e.g. applied to a multireactor process configuration comprising a loop and at least one gas phase reactor, the feed of the donor into the loop reactor can be reduced which gives improved hydrogen response and activity in the first gas phase reactor.

In addition to the actual polymerization reactors used for producing the propylene homo- or copolymer, the polymerization reaction system can also include a number of additional reactors, such as pre- and/or postreactors. The prereactors include any reactor for prepolymerizing the modified catalyst with propylene and/or other α-olefin(s) and/or ethylene, if necessary. The postreactors include reactors used for modifying and improving the properties of the polymer product (cf. below). All reactors of the reactor system are preferably arranged in series.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer on such flowing rate which will make the particles act as a fluid. The fluidizing gas can contain also inert carrier gases, like nitrogen and also hydrogen as a modifier. The fluidized gas phase reactor can be equipped with a mechanical mixer.

The gas phase reactor used can be operated in the temperature range of 50 to 115° C., preferably between 60 and 110° C. and the reaction pressure between 5 and 50 bar and the partial pressure of monomer between 2 and 45 bar.

The propylene homo- or copolymer produced preferably has a MWD of 2 to 20, preferably 3 to 10, and a $MFR_2$ in the range of 0.01 to 1500 g/10 min, preferably 0.05 to 500 g/10 min. The polymer has high stiffness, an increased overall degree of crystallinity and a crystallization temperature measured with DSC of more than 7° C., preferably over 10° C. and in particular 13° C. higher than that of the corresponding non-nucleated polymer. The degree of crystallinity for the propylene homopolymer is generally over 48%, often over 50%, and the elasticity modulus for propylene homopolymer can amount to about 2,000 MPa or more.

If desired, the polymerization product can be fed into a gas phase reactor in which a rubbery copolymer (ethylene) is provided by a (co)polymerization reaction to produce a modified polymerization product. This polymerization reaction will give the polymerization product properties of e.g. improved impact strength.

An elastomeric product can also be provided by melt blending a ready-made or natural elastomer to the polymer product containing no elastomer made in a postreactor. The amount of a rubbery component can vary in wide ranges, being preferably about 5 to 40 wt-%, more preferably about 10 to 30 wt-%, most preferably 10 to 20 wt-%. The elasticity modulus of heterophasic copolymers containing about 12 wt-% of a rubbery component is about 1,500 MPa or more.

The present polymerisation product from the reactor(s), so called reactor powder in the form of polypropylene powder, fluff, spheres etc., is normally melt blended, compounded and pelletised with adjuvants, such as additives, fillers and reinforcing agents conventionally used in the art and/or with other polymers. Thus, suitable additives include antioxidants, acid scavengers, antistatic agents, flame retardants, light and heat stabilizers, lubricants, nucleating agents, clarifying agents, pigments and other colouring agents including carbon black. Fillers such as talc, mica and wollastonite can also be used. The colouring agent used in the present invention can be any colouring pigment, organic or inorganic. The amount of pigments is usually 0.01 to 5% by weight of the polypropylene component.

According to a preferred embodiment, the present propylene polymers are blended and optionally compounded with a propylene polymer manufactured with an unmodified catalyst, or with another polymer, in particular a polyolefin selected from the group of LD-, LLD-, MD- and HD-polyethylenes and polybutylene.

The reinforcing agents suitable for use in the present invention can be selected from chopped or continuous glass fibres, carbon fibres, steel fibres and cellulose fibres.

The present blends can be produced by methods known per se, e.g. by using a batch or a continuous process. As examples of typical batch mixers, the Banbury and the heated roll mill can be mentioned. Continuous mixers are exemplified by the Farrel mixer, the Buss co-kneader, and single- or twin-screw extruders.

The homopolymer or copolymer composition thus obtained can be used for the manufacture of moulded and extruded articles, in particular articles processed by injection moulding, compression moulding, thermoforming, blow moulding or foaming. The present polymers are useful for preparing pipes, tubes, cables, sheets or films as well as for manufacturing cups, pails, bottles, containers, boxes, automotive parts, appliances, technical articles, caps, closures and lids.

The following non-limiting examples illustrate the invention.

The test methods used in the following tables and examples comprised the following:

MFR$_2$: ISO 1133 Standard, at 230° C., using 2.16 kg load

Flexural modulus: ISO 178/ at room temperature (if no other T mentioned)

Intrinsic viscosity was measured according to Borealis Standard BTM 14651, which is based on ISO 1628-3:1992 (E).

Instrumentated falling weight impact was measured according to Borealis Standard BTM 14439, which is based on ISO 6603-2V.

Determination of xylene soluble fraction (XS): 2.0 g of polymer are dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into two 100 ml flasks.

The solution from the first 100 ml vessel is evaporated in nitrogen flow and the residue is dried under vacuum at 90° C. until constant weight is reached.

The xylene soluble fraction is calculated using the following equation:

$$XS\% \ (100 \times m_1 \times v_0)/(m_0 \times v_1)$$

wherein $m_0$=initial polymer amount (g)

$m_1$=weight of residue (g)

$v_0$=initial volume (ml)

$v_1$=volume of analysed sample (ml)

Determination of amorphous fraction (AM): The solution from the second 100 ml flask is treated with 200 ml of acetone under vigorous stirring. The precipitate is filtered and dried in a vacuum oven at 90° C. The amorphous fraction is calculated using the following equation:

$$AM\% = (100 \times m_2 \times v_0)/(m_0 \times v_1)$$

wherein $m_0$=initial polymer amount (g)

$m_2$=weight of the precipitate (g)

$v_0$=initial volume (ml)

$v_1$=volume of analysed sample (ml)

Thermal Properties:

Melting temperature, $T_m$, crystallisation temperature, $T_{cr}$, and the degree of crystallinity were measured with Mettler TA820 differential scanning calorimetry (DSC) on 3±0.5 mg samples. Both crystallisation and melting curves were obtained during 10° C./min cooling and heating scans between 30° C. and 225° C. Melting and crystallisation temperatures were taken as the peaks of endotherms and exotherms. The degree of crystallinity was calculated by comparison with heat of fusion of a perfectly crystalline polypropylene, ie., 209 J/g.

EXAMPLE 1

All raw materials were essentially free from water and air and all material additions to the reactors and the different steps were done under inert conditions.

200 ml of a 3.2/1 mixture of Ondina oil 68 and Vaselin Grease SW (Fuchs Lubricanti S.R.L.) was added to a 1 litre glass reactor. The mixture was heated to 85° C. and nitrogen was bubbled through the mixture for 2 hours. While keeping about 0.5 bar nitrogen pressure in the reactor the temperature was decreased to 70° C. and 51 gram highly active and stereospecific Ziegler Natta catalyst (ZN catalyst) was added. The ZN catalyst was made according to Finnish Patent No. 88047, and had Ti content 1.7 wt-%. With 0.5 bar nitrogen pressure and 70° C. the mixture was slowly stirred for 30 minutes. The mixture was cooled to 30° C. 7.66 ml 100% triethyl aluminium (TEA), corresponding to an Al/Ti molar ratio of 3.1, 2.5 ml dicyclopentyl dimethoxy silane (donor D), corresponding to a D/Ti molar ratio of 0.6, and 5.16 ml heptane was mixed at room temperature and allowed to be in contact for 20 minutess. The TEA, donor D and heptane mixture was added to the reactor and the reactor was stirred for 15 minutes. 41 gram vinyl cyclohexane (VCH), corresponding to a VCH/catalyst ratio of 0.8, was added to the reactor during 15 minutes. While mainining the 0.5 bar nitrogen pressure the temperature was increased to 55° C. and maintained at said temperature for 20 hours. Finally, the reactor was cooled to about 20° C. and samples of the VCH modified catalyst were taken for polymerization tests and for determining unreacted VCH content.

The concentration of unreacted VCH was analysed with gas chromatography.

Polymerization with the VCH modified catalyst was done in a 5 litre reactor with stirrer. 0.274 ml TEA, 0.046 ml donor D and 30 ml pentane were mixed and allowed to react for 5 minutes. Half of the mixture was added to the reactor and the other half was mixed with 126 mg of the oil/grease/catalyst mixture (=22.8 mg catalyst mixture). After 10 minutes the oil/grease/catalyst/-TEA/donor D/n-pentane mixture was added to the reactor. The Al/Ti molar ratio was 250 and Al/D molar ratio 10. 550 mmol hydrogen and 1400 gram propylene were added into the reactor and the temperature was raised to 70° C. within 20 minutes while mixing during which time prepolymerization took place. The reaction was stopped after 1 hour at 70° C. by flashing away unreacted propylene.

The polymer powder was pelletized and injection moulded into plagues. Flexural modulus was measured on pieces cut from the plaques and the other analyses were done on pellets. The results are shown in Table 1.

EXAMPLE 2

This Example was carried out in accordance to Example 1 with the exception that during the VCH modification step the D/Ti ratio was 1.0 and the Al/Ti ratio was 3.5. The results are shown in Table 1.

EXAMPLE 3

This Example was carried out as Example 1 with the exception that during the VCH modification step the D/Ti ratio was 2.0 and the Al/Ti ratio was 4.2. The results are shown in Table 1.

Comparative Example 1

This Example was carried out as Example 1 with the exception that no donor was used during the VCH modification step and the Al/Ti ratio was 3.5. The results are shown in Table 1.

EXAMPLE 4

This Example was carried out in accordance to Example 1 with the exception that during the VCH modification step the D/Ti ratio was 1.0 and the Al/Ti ratio was 2.8, and during the propylene polymerization the Al/D ratio was 5. The results are shown in Table 1.

Comparative Example 2

This Example was done as Example 1 but without any donor and using an Al/Ti ratio of 2.5 in the VCH modification step and with an Al/D ratio of 5 during propylene polymerization. The results are shown in Table 1.

EXAMPLE 5

This Example was carried out in accordance with Example 1 with the exception that the D/Ti ratio was 1.0 and the Al/Ti ratio was 2.8 in the VCH modification step and the temperature in the propylene polymerization was 80° C. The results are shown in Table 1.

Comparative Example 3

This Example was done as Example 1 but without any donor and using an Al/Ti ratio of 2.5 in the VCH modification step. The temperature during propylene polymerization was 80° C. The results are shown in Table 1.

EXAMPLE 6

This example concerns heterophasic polypropylene. This example was carried out as example 1 with the exception that during the VCH modification step the D/Ti ratio was 1.0 and Al/Ti ratio was 2.8. The homopolymerization of propylene was done as in example 1, but with 62 mg catalyst/wax mixture (=10.1 mg catalyst), the time was only 45 minutes, temperature was 80° C. and amount of hydrogen was 600 mmol.

After the homo PP phase the polymerization was continued by producing ethylene/propylene rubber in gas phase. After the homo PP phase unreacted propylene was flashed out and the reactor was flushed with nitrogen and finally with ethylene/propylene 1:1 molar gas mixture to remove all hydrogen and nitrogen. Thereafter 1 mmol hydrogen was added and the pressure was increased to 7 bar and temperature to 80° C. during 11 minutes. The pressure was maintained at 7 bar by continuously feeding the ethylene/propylene 1:1 molar gas mixture to the reactor according to consumption. After 46 minutes at 80° C. the composition of the gas mixture in the reactor was analysed with GC. The comonomer ratio (=ethylene/propylene molar ratio) was 0.52. After 49 minutes at 80° C., corresponding to production of about 20 wt-% ethylene/propylene rubber in the final PP product, the reaction was stopped by flashing out unreacted monomers and cooling.

In addition to the analyses and tests described in example 1 the following analyses and tests were done: total ethylene content and ethylene content in the amorphous part (=ethylene/propylene rubber) with FTIR, intrinsic viscosity of the ethylene/propylene rubber, instrumentated falling weight impact. The results are shown in Table 2.

Comparative Example 4

This example was carried out according to Example 6, with the exception that during the VCH modification step no donor was used. Hydrogen in the homo PP phase was 550 mmol.

After the homo PP phase the polymerization was continued by producing ethylene/propylene rubber in gas phase. In the gas phase 10 mmol hydrogen was used. GC analyses of the monomer mixture in the reactor showed that the comonomer ratio was 0.48, which is about the same as in Example 6. The results are shown in Table 2.

Comparative Example 5

This Example was done in accordance with Example 1 but in the VCH modification step the VCH/catalyst ratio was 0.4, the Al/Ti ratio 1.2 and the D/Ti ratio was 0.3. The concentration of unreacted VCH in the catalyst/oil/grease mixture was 13,000 ppm. Due to the small Al/Ti ratio, the polymerization time is very long.

on the amount of xylene solubles and stiffness of the polymer. Further, these properties depend on the ratio between the donor and the titanium (in the examples abbreviated the "D/Ti" ratio). The examples also clearly show that

TABLE 1

Catalyst modification conditions, polymerization conditions, analyses and test of the polypropylene products

|  |  | Example 1 | Example 2 | Example 3 | Comparative Example 1 | Example 4 | Comparative Example 2 | Example 5 | Comparative Example 3 |
|---|---|---|---|---|---|---|---|---|---|
| Catalyst modification |  |  |  |  |  |  |  |  |  |
| D/Ti molar ratio |  | 0.6 | 1 | 2 | 0 | 1 | 0 | 1 | 0 |
| Al/Ti molar ratio |  | 3.1 | 3.5 | 4.2 | 2.5 | 2.8 | 2.5 | 2.8 | 2.5 |
| Unreacted VCH in catalyst mud | ppm | 200 | 280 | 8450 | 190 | 2860 | 190 | 2860 | 190 |
| Polymerization of propylene |  |  |  |  |  |  |  |  |  |
| Temperature | °C. | 70 | 70 | 70 | 70 | 70 | 70 | 80 | 80 |
| AL/Do ratio |  | 10 | 10 | 10 | 10 | 5 | 5 | 10 | 10 |
| Analyses and tests |  |  |  |  |  |  |  |  |  |
| Activity | kg/g Cat h | 38 | 40 | 37 | 37 | 34 | 35 | 54 | 60 |
| Xylene soluble | wt-% | 1.4 | 1.2 | 1.1 | 1.9 | 1.2 | 1.9 | 1.2 | 1.7 |
| Isotacticity from IR | % | 102.7 | 102.5 | 102.5 | 102.6 | 103.4 | 102.4 | 102.7 | 102.1 |
| Melt flow rate (230° C., 2.16 kg | g/10 min | 16 | 18 | 17 | 20 | 17 | 19 | 18 | 20 |
| Crystallization temperature, DSC | °C. | 128.3 | 128.4 | 127.9 | 127.7 | 128.2 | 127.4 | 128.5 | 127.5 |
| Flexural modulus | MPa | 2060 | 2080 | 2060 | 1980 | 2080 | 1950 | 2040 | 1920 |

TABLE 1

Catalyst modification conditions, polymerization conditions, analyses and tests of heterophasic copolymers

|  |  | Example 6 | Comparative example 4 |
|---|---|---|---|
| Catalyst modification |  |  |  |
| D/Ti molar ratio |  | 1 | 0 |
| Al/Ti molar ratio |  | 2.8 | 2.5 |
| Unreacted VCH in catalyst mud | ppm | 2860 | 190 |
| Homo polymerization of propylene |  |  |  |
| Temperature | C | 80 | 80 |
| Hydrogen | mmol | 600 | 550 |
| Al/Do ratio |  | 10 | 10 |
| Time | min | 45 | 45 |
| Polymerization of ethytene/propylene rubber |  |  |  |
| Temperature | C | 80 | 80 |
| Time | min | 49 | 38 |
| Hydrogen | mmol | 11 | 10 |
| Comonomer ratio in reactor | molar ratio | 0.52 | 0.48 |
| Analyses and tests |  |  |  |
| Melt flow rate (230 C, 2.16 kg) | g/10 min | 6.3 | 7.5 |
| Total ethylene | w-% | 7.9 | 7.5 |
| Xylene solubles | w-% | 21.7 | 20.8 |
| Amorphous part | w-% | 20.6 | 19.5 |
| Ethylene in amorphous part | w-% | 37.5 | 36.2 |
| Intrinsic viscosity of rubber | dl/g | 4.1 | 3.5 |
| Crystatlization temperature, DSC | C | 128.1 | 126.8 |
| Melting point | C | 166.1 | 165.6 |
| Flexural modulus | MPa | 1260 | 1250 |
| Instrumentated falling weight impact at −20 C |  |  |  |
| - total penetration energy | J | 49.7 | 42.3 |

As will appear from the above examples, the addition of a donor during the VCH modification step has a clear impact stiffness and xylene solubles are interrelated in the sense that lower xylene solubles gives higher stiffness.

In the above examples, the Al/Ti ratio in the VCH step was adjusted to provide a sufficiently low concentration of unreacted VCH. In some instances, the unreacted VCH content is in some cases more than 1000 ppm, but the concentration could have been lowered by prolonging the VCH modification time. As regards stiffness, a high VCH content is not severely detrimental, because even with 8500 ppm of unreacted VCH more than 95% of the added VCH has been polymerized. However, as explained above it is generally desired to lower the amount of residual VCH to below 2000 ppm.

Examples 1–3 illustrate the effect of increasing D/Ti during VCH modification on stiffness (and xylene solubles). In Comparative Example 1, the D/Ti ratio is zero, indicating that no donor is used in the VCH modification and, as a result, the stiffness is about 100 MPa lower (and xylene solubles 0.5–0.8 w-% higher) than in Examples 1–3.

In Example 4 (D/Ti 1) and Comparative Example 2 (D/Ti 0, no donor) a similar comparison is made, but now with a lower Al/D ratio in the propylene polymerization step than in Examples 1–3. Lower Al/D ratio (=higher donor concentration) increases stiffness. With these two examples we show that also with high donor concentration in the propylene polymerization, donor D present during the VCH modification step increases stiffness with about 100 MPa.

Example 5 (D/Ti=1) is compared to Comparative Example 3 (D/Ti =0, no donor), as above, but now the temperature was 80° C. during propylene polymerization. Higher polymerization temperature gives higher stiffness. With these two examples it is shown that also at higher temperature stiffness of the polymer increases as an effect of donor D present during VCH modification.

By comparing example 6 (D/Ti =1) with Comparative example 4 (D/Ti =0, no donor) it is shown that it is advantageous if donor D is present during the VCH modification step also when producing heterophasic copolymers. The two products have the same stiffness but example 6, with D/Ti=1, has clearly better impact properties (due to slightly more rubber) than comparative example 4. To anyone skilled in the art, this shows that if donor D is present during the VCH modification step, the heterophasic copolymer made from that catalyst exhibit improved stiffness/impact balance. E.g. if the product in example 6 had had the same impact as the Comparative Example 4, then the product in 6 should have had higher stiffness than the product from Example 4.

What is claimed is:

1. A nucleated high-stiffness propylene polymer composition obtained by homopolymerization or copolymerization of propylene in the presence of a catalyst system comprising a catalyst component, a cocatalyst component, and an external donor, the procatalyst component of the catalyst system containing magnesium, titanium, halogen and an electron donor, said catalyst being modified by polymerizing it with a vinyl compound of the formula

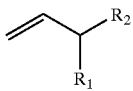

wherein $R_1$ and $R_2$ together form a 5 or 6 membered saturated or unsaturated or aromatic ring in the presence of a cocatalyst and a strongly coordinating external donor of at least one compound of formula III or formula IV as follows:

$$R^4R^5C(COMe)_2 \qquad (III)$$

wherein $R^4$ and $R^5$ are the same or different and are a linear, branched or cyclic aliphatic or an aromatic hydrocarbon group; and $$R^1_nR^2_mSi(R^3O)_{4-n-m} \qquad (IV)$$

wherein $R^1$ and $R^2$ can be the same or different and they stand for a linear, branched or cyclic aliphatic, or aromatic hydrocarbon group;

$R^3$ is methyl or ethyl;

n is an integer 0 to 3;

m is an integer 0 to 3; and n+m is 1 to 3, with the proviso that the coordinating effect of the donor is stronger than that of a donor of formula (IV) wherein $R^1$ is methyl, $R^3$ is methyl and $R^2$ is a cyclohexyl group.

2. The polymer composition according to claim 1, exhibiting an at least 3% higher stiffness than is obtained by polymerization of propylene in the presence of a catalyst which is modified in the absence of a strongly coordinating external donor.

3. The polymer composition according to claim 2, exhibiting a 5 to 15% higher stiffness than is obtained by polymerization of propylene in the presence of a catalyst which is modified in the absence of a strongly coordinating external donor.

4. The polymer compound according to claim 1, comprising a propylene heterophasic copolymer exhibiting 2 to 20% higher impact strength than is obtained by polymerization of propylene and ethylene/propylene with a catalyst, which is modified in the absence of a strongly coordinating external donor.

5. The polymer composition according to claim 1, comprising a propylene homopolymer exhibiting a xylene soluble fraction at 23° C. of less than 1.5%.

6. The polymer composition according to any of claims 1 to 3, wherein the catalyst has been modified by polymerizing it with a vinyl compound in the presence of a cocatalyst and a silane based donor having the formula II $$R^6_nSi(OMe)_{4-n} \qquad (II)$$

wherein $R^6$ is a branched or cyclic aliphatic or aromatic group, and n is 1 or 2.

7. The polymer composition according to claim 6, wherein the donor is dicyclopentyl dimethoxysilane, diisopropyl dimethoxysilane, di-isobutyl dimethoxysilane, or di-t-butyl dimethoxysilane.

8. The polymer composition according to claim 7, wherein the donor is dicyclopentyl dimethoxysilane.

9. The polymer composition according to claim 6, wherein the molar ratio donor/Ti is 0.1 to 10 during the modification step.

10. The polymer composition according to claim 6, wherein the molar ratio Al/Ti is in excess of 1 during the modification step.

11. The polymer composition according to claim 1, obtained by homopolymerization or copolymerization of propylene in the presence of a modified catalyst, wherein the polymerization is carried out in the presence of a donor selected from the group consisting of dicyclopentyl dimethoxysilane, diisopropyl dimethoxysilane, methylcyclohexyldimethoxy silane, di-isobutyl dimethoxysilane, and di-t-butyl dimethoxysilane.

12. The polymer composition according to claim 1, exhibiting a crystallization temperature of a nucleated propylene homopolymer or heterophasic copolymer of more than 120° C., and a crystallinity of more than 50% of a nucleated propylene homopolymer.

13. The polymer composition according to claim 11, exhibiting a crystallization temperature of more than 124° C.

14. The polymer composition according to claim 1, wherein said propylene polymer is nucleated with about 0.0001 to 2% by weight of a polymerized vinyl compound of the formula

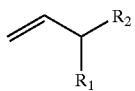

wherein $R_1$ and $R_2$ together form a 5 or 6 membered saturated or unsaturated or aromatic ring.

15. The polymer composition according to claim 14, wherein the propylene polymer contains cycloalkane units, styrene or p-methyl-styrene or mixtures thereof.

16. A process for producing a high-stiffness propylene polymer nucleated with a polymeric nucleating agent containing vinyl compound units, comprising the steps of modifying a catalyst system, the procatalyst component of which contains magnesium, titanium, halogen and an electron donor, by polymerizing a vinyl compound of the formula

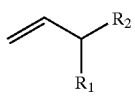

wherein $R_1$ and $R_2$ together form a 5 or 6 membered saturated or unsaturated or aromatic ring, at a weight ratio of the vinyl compound to the catalyst amounting to 0.1 to below 3, in the presence of said catalyst, a cocatalyst and a strongly coordinating external donor, by carrying out the modification in a medium which does not essentially dissolve the polymerized vinyl compound and by continuing the polymerization of the vinyl compound until the concentration of unreacted vinyl compounds is less than about 0.5 wt-%, to produce a modified catalyst composition, said modification being carried out essentially before any prepolymerization step of the catalyst with an olefinic monomer, and polymerizing propylene optionally together with comonomers in the presence of said modified catalyst composition, wherein the strongly coordinating external donor is at least one compound of formula III or formula IV as follows:

$$R^4R^5C(COMe)_2 \qquad (III)$$

wherein $R^4$ and $R^5$ are the same or different and are a linear, branched or cyclic aliphatic or an aromatic hydrocarbon group; and

$$R^1{}_nR^2{}_mSi(R^3O)_{4-n-m} \qquad (IV)$$

wherein $R^1$ and $R^2$ can be the same or different and they stand for a linear, branched or cyclic aliphatic, or aromatic hydrocarbon group;

$R^3$ is methyl or ethyl;

n is an integer 0 to 3;

m is an integer 0 to 3; and n+m is 1 to 3, with the proviso that the coordinating effect of the donor is stronger than that of a donor of formula (IV) wherein $R^1$ is methyl, $R^3$ is methyl and $R^2$ is a cyclohexyl group.

17. The process according to claim 16, wherein the titanium compound is $TiCl_3$ or $TiCl_4$.

18. The process according to claim 16 or 17, wherein the molar ratio of the strongly coordinating donor to the titanium of the procatalyst component is 0.1 to 10 during the catalyst modification step.

19. The process according to claim 16, wherein the molar ratio Al/Ti is in excess of 1 during the modification step.

20. The process according to claim 16, wherein the catalyst is modified by polymerizing it with a vinyl compound in the presence of a cocatalyst and an external donor selected from the group consisting of dicyclopentyl dimethoxysilane, diisopropyl dimethoxysilane, di-isobutyl dimethoxysilane, and di-t-butyl dimethoxysilane.

21. The process according to claim 20, wherein the external donor is dicyclopentyl dimethoxysilane.

22. The process according to claim 16, wherein the vinyl compound is selected from the group consisting of vinyl cyclohexane, vinyl cyclopentane, vinyl-2-methyl cyclohexane and vinyl norbornane, styrene and p-methyl-styrene and mixtures thereof.

23. The process according to claim 16, wherein the catalyst composition comprises a cocatalyst selected from the group consisting of aluminium compounds, alkaline metal compounds and alkaline earth metal compounds.

24. The process according to claim 16, wherein the polymerization of propylene is carried out in the presence of an external donor selected from the group consisting of dicyclopentyl dimethoxy silane, di-tert-butyldimethoxy silane, methyl cyclohexyldimethoxy silane, diisopropyldimethoxy silane and diisobutyldimethoxy silane.

25. The process according to claim 24, wherein the donor used in the modification step is the same as used in propylene polymerization.

26. The process according to claim 16, wherein the catalyst modification is carried out in a medium selected from the group of isobutane, propane, pentane, hexane or a viscous substance, which is inert to the reactants.

27. The process according to claim 26, wherein the viscous substance comprises a viscous substance having a viscosity of 1,000 to 15,000 cP at room temperature.

28. The process according to claim 16, wherein the catalyst modification is carried out by introducing a catalyst, a cocatalyst and a strongly coordinating donor into an inert fluid forming the reaction medium;

feeding a vinyl compound to the agitated reaction medium at a weight ratio of 0.1 to 2 vinyl compound/catalyst;

subjecting the vinyl compound to a polymerization reaction in the presence of said catalyst at a temperature of 10 to 70° C.; and continuing the polymerization reaction until a maximum concentration of the unreacted vinyl compound of less than 2000 ppm by weight is obtained.

29. The process according to claim 28, wherein the cocatalyst is first fed into the reaction medium.

30. The process according to claim 16, wherein propylene is polymerized by subjecting propylene and optionally other α-olefins and/or ethylene to polymerization in a plurality of polymerization reactors connected in series.

31. The process according to claim 16, wherein polymerization is carried out in at least one reactor selected from the group of slurry and gas phase reactors.

32. The process according to claim 31, wherein the polymerization product of the slurry or the gas phase reactor is fed into a further reactor in which the polymerization product is combined with an elastomeric component to produce a modified polymerization product.

33. The process according to claim 16, wherein a nucleated propylene homopolymer is prepared exhibiting a xylene soluble fraction at 23° C. of less than 1.5%.

34. The process according to claim 16, wherein the propylene polymer composition is prepared exhibiting an at least 3% higher stiffness than a propylene polymer composition prepared by polymerization of propylene in the presence of a catalyst which is modified in the absence of a strongly coordinating external donor.

35. The process according to claim 16, wherein a propylene heterophasic copolymer is prepared exhibiting 2 to 20% higher impact strength than a propylene heterophasic copolymer composition prepared by polymerization of propylene and ethylene/propylene with a catalyst, which is modified in the absence of a strongly coordinating external donor.

36. The process according to claim 16, further comprising a step of moulding the polymer into articles.

37. The process according to claim 36, wherein the polymers are moulded into pipes, cables, tubes, cups, pails, bottles, boxes, containers, automotive parts, appliances, technical articles, caps, closures, lids, sheets or films.

38. The polymer composition according to claim 5, comprising a propylene homopolymer exhibiting a xylene soluble fraction at 23° C. of less than 1.4%.

39. The polymer composition according to claim 6, wherein n is 2.

40. The polymer composition according to claim 9, wherein the molar ratio donor/Ti is 0.3 to 5 during the modification step.

41. The polymer composition according to claim 10, wherein the molar ratio Al/Ti is 2 to 10 during the modification step.

42. The polymer composition according to claim 10, wherein the molar ratio Al/Ti is 2.5 to 6 during the modification step.

43. The polymer composition according to claim 11, wherein the polymerization is carried out in the presence of dicyclopentyl dimethoxysilane.

44. The polymer composition according to claim 13, exhibiting a crystallization temperature of more than 126° C.

45. The polymer composition according to claim 15, wherein the propylene polymer contains units of vinyl cyclohexane, vinyl cyclopentane, vinyl-2-methyl cyclohexane, vinyl norbornane or mixtures thereof.

46. The process according to claim 18, wherein the molar ratio of the strongly coordinating donor to the titanium of the procatalyst component is 0.3 to 5 during the catalyst modification step.

47. The process according to claim 19, wherein the molar ratio Al/Ti is 2 to 10 during the modification step.

48. The process according to claim 19, wherein the molar ratio Al/Ti is 2.5 to 6 during the modification step.

49. The process according to claim 23, wherein the cocatalyst is an organoaluminium compound.

50. The process according to claim 24, wherein the external donor is dicyclopentyl dimethoxy silane.

51. The process according to claim 28, wherein the catalyst modification is carried out by
introducing a catalyst, a cocatalyst and a strongly coordinating donor into an inert fluid forming the reaction medium;
feeding a vinyl compound to the agitated reaction medium at a weight ratio of 0.1 to 1.5 vinyl compound/catalyst;
subjecting the vinyl compound to a polymerization reaction in the presence of said catalyst at a temperature of 35 to 65° C.; and
continuing the polymerization reaction until a maximum concentration of the unreacted vinyl compound of less than 1000 ppm by weight is obtained.

52. The process according to claim 34, wherein the propylene polymer composition is prepared exhibiting an at least 5 to 15% higher stiffness than propylene prepared by polymerization in the presence of a catalyst which is modified in the absence of a strongly coordinating external donor.

53. The process according to claim 36, wherein the moulding is an injection moulding, compression moulding, thermoforming, blow moulding, or foaming or extrusion.

54. The polymer composition according to claim 1, wherein the strongly coordinating external donor is at least one compound of formula (III), wherein $R^4$ and $R^5$ are each individually selected from the group consisting of linear $C_1$ to $C_{12}$ hydrocarbon, branched $C_1$ to $C_{12}$ hydrocarbon, and cyclic $C_4$ to $C_8$ aliphatic hydrocarbon.

55. The process according to claim 16, wherein the strongly coordinating external donor is at least one compound of formula (III), wherein $R^4$ and $R^5$ are each individually selected from the group consisting of linear $C_1$ to $C_{12}$ hydrocarbon, branched $C_1$ to $C_{12}$ hydrocarbon, and cyclic $C_4$ to $C_8$ aliphatic hydrocarbon.

* * * * *